United States Patent [19]
Dupont

[11] 3,883,800
[45] May 13, 1975

[54] CAPACITIVE SENSOR POSITION DETECTING SYSTEMS FOR MAGNETIC TAPES AND THE LIKE

[75] Inventor: Jean G. Dupont, L'Hay-les-Roses, France

[73] Assignee: Compagnie Internationale pour l'Informatique, Louveciennes, France

[22] Filed: Jan. 8, 1974

[21] Appl. No.: 431,764

[30] Foreign Application Priority Data
Jan. 8, 1973 France............................ 73.00443

[52] U.S. Cl............................................. 324/61 R
[51] Int. Cl............................................. G01r 27/26
[58] Field of Search .......... 324/61 R, 61 P; 317/246

[56] References Cited
UNITED STATES PATENTS
3,221,256  11/1965  Walden ............................ 324/61 P
3,222,591  12/1965  Mynall ........................... 324/61 R X

*Primary Examiner*—Stanley T. Krawczewicz
*Attorney, Agent, or Firm*—Kemon, Palmer & Estabrook

[57] ABSTRACT

A capacitive sensor of the position of a tape capable of constituting an electrode of a variable condenser with respect to a wall along which it may be displaced is provided with a pair of parallelly extending metallizations along said wall. A pole of a low frequency waveform A.C. generator is connected to one of the said metallizations and the other metallization is connected to an input of an integrating operational amplifier. The peak value of the waveform is such as to ensure a complete charge of two series-connected capacitors constituted by said metallizations and the facing portion of the tape in a time interval much longer than the time constant defined by the overall capacitor value and the series, or linear, resistance of the tape at the highest possible value thereof. An automatic reset to zero of the integrator operates at each alternation of the waveform which is ineffective on the input of the amplifier. The metallization which is not connected to the generator may be divided into a plurality of segments each connected to an operational amplifier and the outputs of said amplifiers may be combined in a linear response circuit arrangement.

10 Claims, 6 Drawing Figures

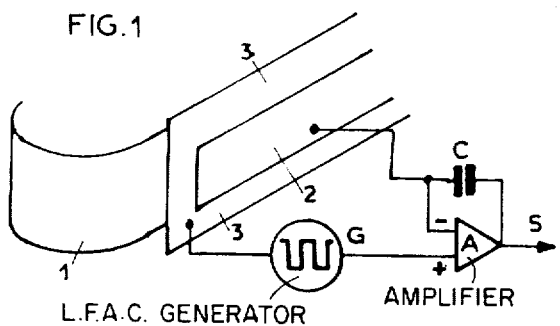
FIG.1
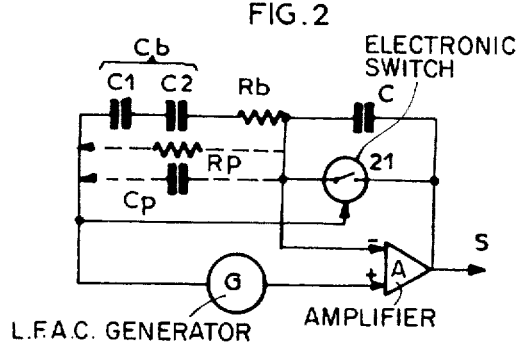
FIG.2
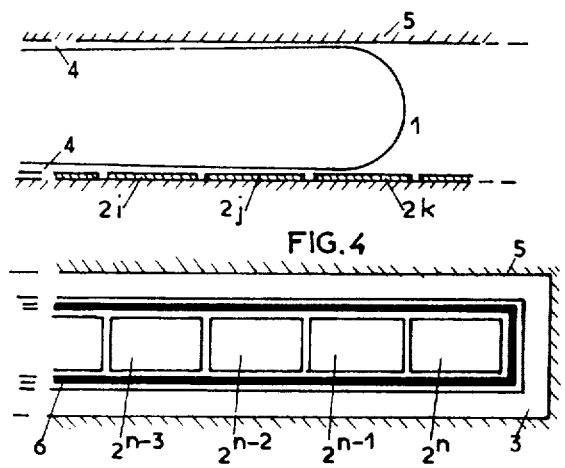
FIG.3
FIG.4
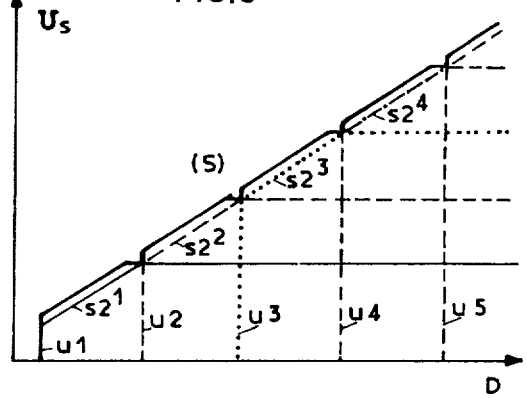
FIG.5
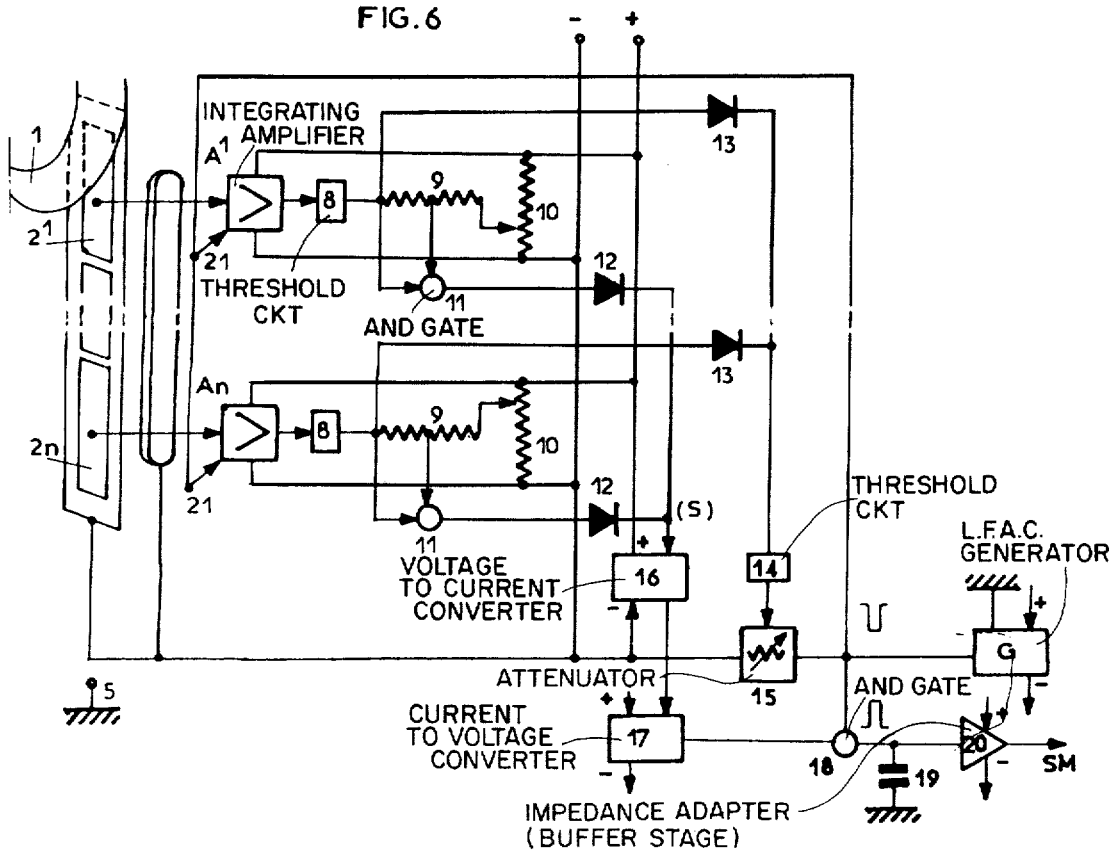
FIG.6

3,883,800

CAPACITIVE SENSOR POSITION DETECTING SYSTEMS FOR MAGNETIC TAPES AND THE LIKE

SHORT SUMMARY OF THE INVENTION

Capacitive sensor position detecting systems are known which comprise a metallization of a wall along which a conductive member may move. However, in such systems, the conductive members all are of identical or substantially identical series electrical resistance. The magnetic tapes which are presently commercially available on the other hand, may exhibit a variation in linear resistance of which may range from about 0.5 ohms up to more than 1,000 megohms. Obviously, capacitive sensor tape loop position detecting systems cannot be adjusted each time a tape of a one linear resistance is replaced by a tape of a quite different linear resistance during operation of a magnetic tape transport equipment.

It is an object of the invention to provide a tape capacitive sensor position detecting system which is not affected by the changes of values of electrical resistance of the tapes.

From another point of view, when operating, the tape transport equipments cannot ensure a fixed relative position of the tape with respect to the wall of the vacuum columns of the equipment in which parts of said tape constitute buffers, i.e., the spacing between the tape and the wall will vary during the transport thereof.

It is a further object of the invention to provide a tape capacitive sensor position detecting system which, is not subject to variations due to changes of linear resistance in the tapes, and is not subject to variations due to changes in the proximity of the tape to the electrode-carrying wall of the column.

BRIEF DESCRIPTION OF THE DRAWINGS

FIG. 1 broadly shows the structure of a capacitive sensor position detecting system according to the invention;

FIG. 2 shows the purely electrical diagram of this structure;

FIG. 3 shows how a magnetic tape forms a loop within a vacuum column and how a divided electrode arrangement may be provided on a facing wall of said column;

FIG. 4 shows a partial view of the wall of said vacuum column on which such divided metallization is applied;

FIG. 5 shows the function $U_s$ plotted against D in an arrangement according to the invention; — $U_s$ is the output voltage of the system and D is the distance of the loop of the tape with respect to the mouth of the vacuum column; and, FIG. 6 shows an example of circuitry from which, according to a feature of the invention, such a US/D plot can be obtained.

DETAILED DESCRIPTION OF THE DRAWINGS

A tape such for instance as a magnetic tape which passes within a vacuum column, of lateral walls 5, and forms a loop 1 therein, does not contact the walls but is spaced therefrom by a small distance 4 which is not constant along the length of the loop. This spacing is advantageous as it avoids wear of the tape from a reduction of friction and minimizes vibrations of the loop within the column.

One of the walls 5 of the column is provided with a pair of metallizations 2 and 3 and, preferably, the metallization 3 surrounds the metallization 2, FIG. 1, or the divisions such as $2^{n-1}$ to $2^n$, FIG. 4, of said metallization 2. The wall of the column having the metallizations is referenced to the electrical ground of the equipment, as shown in FIG. 6. Preferably, though not imperatively, a guard ring 6 is provided around the metallization 2 and may also consist of a metallization of the wall 5. All metallizations may be obtained from application of any one of the well-known "printed circuit" techniques.

At any position of the tape within the column, the tape forms an electrode of a condenser with the metallizations 2 and 3 forming the other electrodes of the condenser. Consequently, from an electrical point of view, FIG. 2, the condenser $Cb$ is made of two serially connected condensers C1 and C2. The electrical linear resistance $Rb$ of the portion of the tape facing the metallizations is in series with such a condenser $Cb$. A generator of a low frequency voltage of A.C. waveform, such for instance as a rectangular waveform, G, is connected by one pole thereof to the metallization 3.

The metallization 2 is connected to one input of an operational amplifier A, having another input referenced to the other pole of the generator G. The input, to which is connected the metallization 2 and the output of the amplifier A are connected by a capacitor C so that the amplifier operates as an integrator, FIGS. 1 and 2. In FIG. 6, this is obtained by grounding the said other pole of the generator G and consequently grounding the other inputs of the operational integrating amplifiers $A^1 \ldots A^n$.

Electrically, a stray resistance $Rp$ and a parasitic capacitance $Cp$ exist across the circuit C1–C2–$Rb$, due to the connecting wires between 2 and A. These stray impedances are rendered negligible when the connections are sheathed as shown in FIG. 6 and said sheath connected to the ground, as is the said guard ring.

With such an arrangement, it is possible to measure a value of $Cb$, from a few picofarads up to a few tens of picofarads which does not depend on $Rb$ when, according to the invention, the peak value UG of the voltage of G ensures the complete charge of $Cb$ in a time interval $t$ much longer than the time constant $Cb \cdot Rb$ in the most unfavorable case, as where $Rb$ approaches 1,000 megohms per linear centimeter of the tape. The electrical charge developed in $Cb$ during such a time interval $t$ equals $Cb \cdot UG$. The corresponding charge developed across C during the same time interval equal C·S. (S being the value of the output of the amplifier A). In a conventional operational amplifier these charges are equal and consequently the output signal S is defined by the following relation: (i) $S = UG \cdot (Cb/C) = K \cdot Cb$, $-K$ being a constant, and is consequently not dependent on the value of $Rb$.

The frequency of the generator G must be made suitably low, for instance, between about 50 and 100 Hertz. This creates a drawback, however, because the tape may undergo variations of position within the column at such speeds that the integrator may saturate. In order to overcome this the integrator is arranged to be reset in any time interval of an alternation of opposite polarity to the polarity of the alternation to which the input of the amplifier A is responsive.

The reset to zero of the integrator is obtained from the control of an electronic switch 21 connected across the condenser C of the integrating amplifier. The switch is blocked during the integrating periods and unblocked during the non-integrating periods of the amplifier. In FIG. 6, only the control inputs of said reset switches are shown for the operational integrating amplifiers $A^1$ to $A^n$. These switches are controlled by the alternations which are opposite in polarity to those which unblock the gate 18, which is the output gate of the system leading to the servo-mechanism SM which will control the position of the loop of the tape within the column, according to a conventional scheme, not shown.

Nevertheless, an accurate measurement of the overall variation of capacity along the complete depth of the column cannot be suitably ensured when the spacing of the tape from the wall of the column is not of a constant value. In actual practice no such condition can be obtained. According to a further feature of the invention, the metallization 2 is divided into a plurality of successive segments, from $2^1$ at the mouth of the column to $2^n$ at the bottom face of the column. Such a division is shown in FIGS. 3, 4 and 6. Each segment is made sufficiently short so that the spacing of the tape portion from the wall cannot influence the linearity of the response of the system when the tape loop moves along the segment. Each segment is connected to an input of an operational integrating amplifier as shown in FIG. 6. The low frequency waveform generator G is common to all the parts of the system having subdivided metallization 2. It is further provided that the "channels" from the segments duly weigh their response according to the ranks of the segments along the wall 5. The weighed signals are logically united on the input of a transfer stage 16, FIG. 6, which will now be more fully described:

Each segment, from $2^1$ to $2^n$ is connected to an input of an operational integrating amplifier, from $A^1$ to $A^n$ and each amplifier converts the variation of the input current into a variation of an output voltage. The output of each amplifier is connected to a threshold circuit 8 so that the response of the amplifier only appears after the end of the loop 1 of the tape appears opposite the corresponding segment. The thresholds 8 eliminate any effect by stray capacitances and residual leaks of resistive character of the arrangement. The output signal of 8 is applied to an input of a gate 11 the output of which is connected to an input of a logical OR-circuit, made of diodes 12, receiving all the outputs of the gates 11 from all the "channels" of the arrangement. As soon as the threshold of 8 is met by the output of the amplifier A, the gate 11 is unblocked. A series resistor having an output tap at 9 is connected between the output of 8 and an adjustable tap of a potentiometer 10. the resistor of potentiometer 10 is connected across a D.C. voltage supply. The tap 9 is connected to the other input of the gate 11. Consequently, any variable voltage from an amplifier A which exceeds the threshold value 8 is transferred, with an attenuation defined by the portion of the resistor between 8 and 10 up to the tap 9, is added to the weighing voltage defined by the adjustment of the tap of the potentiometer 10. Said adjustment is characteristic of the rank of the channel in the complete circuit. Any voltage from a gate 11 is the addition of two composants, one of which, from $u^l$ to $u^n$, FIG. 5, is defined by the position of the tap of the potentiometer 10 and the other of which is defined by the actual position of the loop of the tape facing the corresponding segment electrode 2. After the loop passes a segment, the second component remains of a constant value. The individual outputs of the channels vary as shown at $S2^1$, $S2^2$, and so on, as shown in FIG. 5 and, consequently, the logical combined signal (S) linearly varies along the complete depth of the column.

Finally, this arrangement provides that, on the output (S) of the system, only the higher voltage from a channel faced by the loop of the tape appears, so that the measurement is accurate and linear over the complete depth D of the column.

But, turning back to the problem of the range of resistance values that the commercial magnetic tapes may present, it is necessary that the time interval $t$, which has been above defined, may be actually selected with respect to conventional operation of tape transport equipments. The selection may be somewhat difficult at extreme limits of the resistance values of the tapes. It must be noted that this selection also depends of the peak value of the waveform generated by G. According to a further feature of the invention, automatic control of the peak value from the generator G is provided by insertion of an attenuator 15 serially connected between the metallization 3 and the output of G. Said attenuator is controlled by a logical combination of the outputs of the threshold circuits 8 of the channels, said combination being ensured by the diodes 13 and being, as apparent, a logical-OR operation. A threshold circuit 14 is inserted between the output of said logical-OR circuit and the control input of the attenuator 15.

The signal (S), which is the output of the logical-OR circuit 12, carries the modulation applied by the generator G, i.e., is modulated as a rectangular waveform in the example shown. An analog signal which can be directly applied to a servo-mechanism, connected to the output SM, must be derived from (S). Instead of having recourse to a conventional scheme in this respect, filtering and development of a D.C. voltage representative of the D.C. component of (S), which scheme will unduly delay the servo-mechanism activation, and further to avoid cumbersome and expensive filters of 50 to 100 Hz, the following arrangement is provided:

Each signal from a gate 11 is applied to the diode 12 and transmitted as an A.C. voltage the peak amplitude of which carries the information of the position of the tape with respect to the segment of the channel. This signal is first converted in the circuit 16, transistor circuit for instance, into a variation of the electrical current: a transistor circuit, as known, presents an electrical current response to a control input voltage. The signal from 16 is then reconverted into a voltage signal at 17, which also consists of a transistor circuit known to have a voltage response to the application of an input current. At the output of 17, and from such a two-step conversion, the output voltage pulses are referenced with respect to the ground, in other words, are referenced with respect to a definite level. This was not the case at (S) since, at this point, the sum of the voltages from the OR-circuit were floating. The measurement signal from 17 is applied to a storage condenser 19, period by period, under the control of the generator periodically unblocking the gate 18 during the alternations which activate the metallization 3. 20 is an impedance adapter stage, an emettodyne transistor stage for instance, which consequently issues a stepped voltage which is, actually, as known, an analog voltage appropriate for a control input of a servo-mechanism.

What is claimed is:

1. A capacitive sensor position detecting system for measuring the relative position of an end loop of a conducting tape the linear resistance of which may vary from about 0.5 ohm to more than 1,000 megohms, with respect to a facing wall along which it can move, wherein:
   the capacitive sensor thereof is comprised of first and second metallizations applied over the length of the said wall, the first metallization surrounding the second, and of the portion of the length of the tape facing said first and second metallizations of the wall,
   a generator of a low frequency A.C. character waveform having one pole thereof connected to the said first metallization,
   an integrating operational amplifier having one input connected to the said second metallization and another input referenced to the other pole of said generator,
   the peak voltage of said waveform charging up the said capacitive sensor within a longer time interval than the time constant set by the product of the overall capacity of said sensor by the highest possible linear resistance value of the tape.

2. A system according to claim 1, wherein said longer time interval is less than the duration of one alternation of a first polarity of the waveform of said generator and said system including a two condition electronic switch, shunt connected across the output and the input of said integrating operational amplifier to be responsive to each alternation of the second polarity of said waveform to conduct and consequently reset said integrator to zero.

3. System according to claim 2, wherein the second metallization is divided in a plurality of successive short segments along said wall, each segment is connected to an input of an integrating operational amplifier, means adding to each output of the said amplifiers a constant D.C. voltage proportional to the rank of the segment in said plurality and the output signals of said D.C. voltage adder means are applied to a logical OR circuit the output of which is routed to the output of the system.

4. System according to claim 3, wherein each output of the said amplifiers comprises a threshold circuit the output of which is connected to a control input of an AND-gate and said D.C. voltage adder means each comprises a potentiometer fed with a constant D.C. voltage and a tapped resistor between the output of said threshold circuit and the tap of said potentiometer, the tap of said tapped resistor being connected to an input of said AND-gate.

5. System according to claim 4, wherein a logical-OR circuit has its inputs connected to the outputs of said threshold circuits and an output controlling an attenuator inserted between the said first metallization and the said pole of the waveform generator.

6. System according to claim 3, wherein the output of the said logical-OR circuit is connected to circuit means converting the unclamped modulated waveform of said OR circuit into a stepped analog voltage.

7. System according to claim 6, wherein said means comprises the cascade of voltage-to-current converter circuit, current-to-voltage ground referenced circuit, a gate controlled by the alternations of the waveform from the source of opposite polarity to that of the alternations applied to said first metallization, and condenser temporary storing means of the signal issuing from said gate.

8. System according to claim 1, wherein a guard ring made of a narrow metallization surrounds said first metallization and is connected to the ground.

9. System according to claim 8, wherein the connecting wires from the second metallization to the amplifier input are sheathed by a screening sheath connected to the ground.

10. In a capacitive position sensing system for permanently measuring the position within a hollow duct of an end loop of a conducting tape the electrical linear resistance of which may have a range of from about 0.5 ohm to about 1,000 megohms, the combination comprising:
   said duct;
   a plurality of metallized electrodes applied along one wall of the duct along which the said end loop is displaced;
   a further metallizated electrode surrounding the said plurality of electrodes,
   means applying an A.C. voltage of rectangular waveform to the said further electrode;
   a plurality of integrating operational amplifiers equal to the number of said plurality of metallized electrodes, each having an input connected to a corresponding one of said plurality of electrodes;
   a plurality of threshold circuits one connected respectively to the output of each said amplifier;
   a plurality of AND gates each having one input respectively connected directly to the output of one of said threshold circuits;
   a plurality of adjustable voltage circuits one also connected to the output of one of said threshold circuits respectively and each having an output tap connected to the other input of one of said AND gates respectively, said adjustable voltage circuits being adjusted to add to the output voltage of its respective threshold circuit, a constant bias which is progressively increased from each circuit to the next; and
   a logical-OR circuit having as many inputs as are outputs of the said AND-gates;
   said means applying said A.C. voltage of rectangular waveform to said further electrode providing a complete charge within an alternation of a single polarity of said waveform of any condenser comprised by said further electrode, each one of the said metallized electrodes of the plurality and that part of the tape facing any one of the said electrodes of the plurality.

* * * * *